United States Patent
Park et al.

(10) Patent No.: US 11,946,695 B2
(45) Date of Patent: Apr. 2, 2024

(54) APPARATUS AND METHOD FOR PLASTICIZING SOLID OXIDE FUEL CELL

(71) Applicant: LG CHEM, LTD., Seoul (KR)

(72) Inventors: Curie Park, Daejeon (KR); Eun Yong Park, Daejeon (KR); Dong Oh Shin, Daejeon (KR); Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 875 days.

(21) Appl. No.: 16/978,543

(22) PCT Filed: Aug. 20, 2019

(86) PCT No.: PCT/KR2019/010545
§ 371 (c)(1),
(2) Date: Sep. 4, 2020

(87) PCT Pub. No.: WO2020/040515
PCT Pub. Date: Feb. 27, 2020

(65) Prior Publication Data
US 2021/0018268 A1     Jan. 21, 2021

(30) Foreign Application Priority Data
Aug. 22, 2018   (KR) .......................... 10-2018-0097787

(51) Int. Cl.
| | |
|---|---|
| *F27B 21/00* | (2006.01) |
| *H01M 4/88* | (2006.01) |
| *H01M 8/12* | (2016.01) |
| *H01M 8/1246* | (2016.01) |
| *F27D 5/00* | (2006.01) |

(52) U.S. Cl.
CPC ............ *F27B 21/00* (2013.01); *H01M 4/8889* (2013.01); *H01M 8/1246* (2013.01); *F27D 5/0012* (2013.01); *F27D 2005/0093* (2013.01); *H01M 2008/1293* (2013.01)

(58) Field of Classification Search
CPC .............................. H01M 4/8889; F27B 21/00
See application file for complete search history.

(56) References Cited

U.S. PATENT DOCUMENTS

| | | | |
|---|---|---|---|
| 5,755,570 A | 5/1998 | Shinde et al. | |
| 8,894,920 B2 | 11/2014 | Kester et al. | |
| 2009/0068373 A1 | 3/2009 | Lee et al. | |

FOREIGN PATENT DOCUMENTS

| | | |
|---|---|---|
| CN | 1403403 A | 3/2003 |
| CN | 103097845 A | 5/2013 |
| GB | 2475239 A | 5/2011 |
| JP | 10-29872 A | 2/1998 |

(Continued)

OTHER PUBLICATIONS

KR-20120046562-A English translation (Year: 2012).*

(Continued)

*Primary Examiner* — Steven S Anderson, II
*Assistant Examiner* — Kurt J Wolford
(74) *Attorney, Agent, or Firm* — Birch, Stewart, Kolasch & Birch, LLP

(57) ABSTRACT

An apparatus and a method of firing a unit cell for a solid oxide fuel cell performs pre-sintering and main sintering using a single apparatus by adjusting a height of a setter to apply pressure. The pressure prevents warping.

10 Claims, 1 Drawing Sheet

(56) References Cited

FOREIGN PATENT DOCUMENTS

| | | | |
|---|---|---|---|
| JP | 2001-19562 A | | 1/2001 |
| JP | 2001019562 A | * | 1/2001 |
| JP | 2004-53147 A | | 2/2004 |
| JP | 2009-245896 A | | 10/2009 |
| JP | 4377856 B2 | | 12/2009 |
| JP | 5284878 B2 | | 9/2013 |
| KR | 10-2004-0014919 A | | 2/2004 |
| KR | 10-2011-0013801 A | | 2/2011 |
| KR | 10-2011-0050144 A | | 5/2011 |
| KR | 20120046562 A | * | 5/2012 |
| KR | 20140046206 A | * | 4/2014 |
| KR | 10-2016-0068202 A | | 6/2016 |
| KR | 20160068202 A | * | 6/2016 |
| KR | 10-1842319 B1 | | 5/2018 |

OTHER PUBLICATIONS

KR-20140046206-A English translation (Year: 2014).*
JP-2001019562-A English translation (Year: 2001).*
KR-20160068202-A English translation (Year: 2016).*
Mtc, Morgan Technical Ceramics 98 Alumina Ceramic (Al2O3) (Year: 2018).*
International Search Report (PCT/ISA/210) issued in PCT/KR2019/010545 dated Nov. 25, 2019.

* cited by examiner

[FIG. 1]
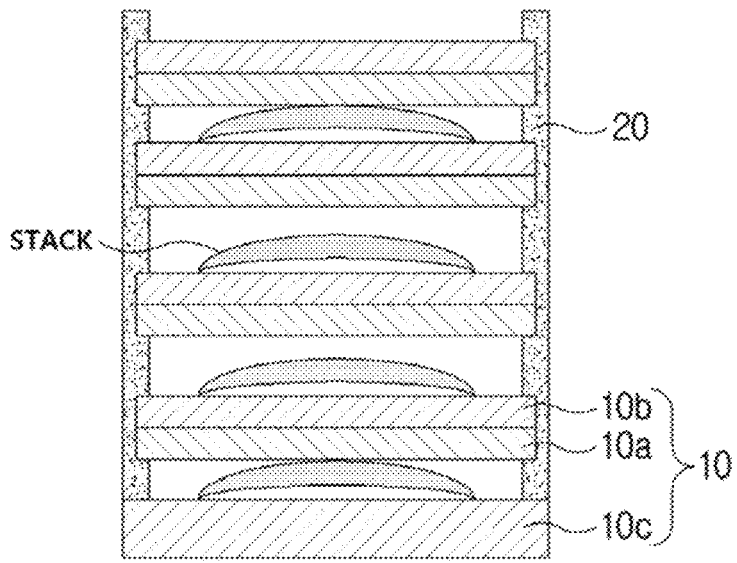
[FIG. 2A]
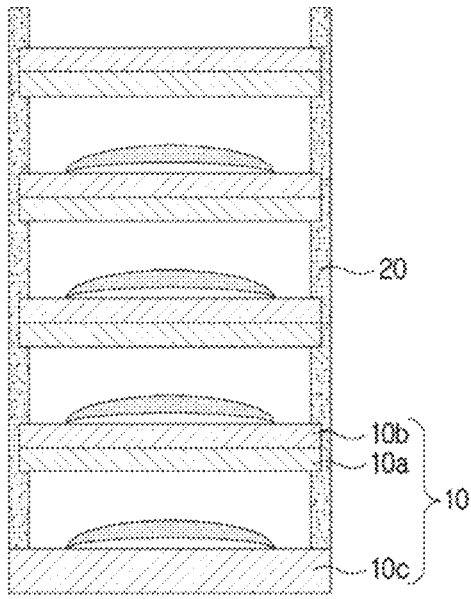
[FIG. 2B]
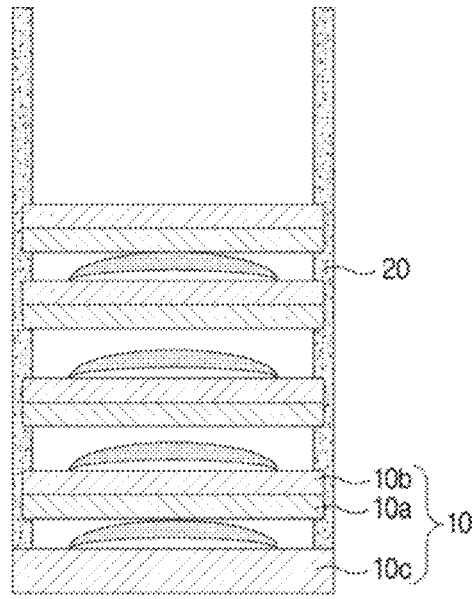

APPARATUS AND METHOD FOR PLASTICIZING SOLID OXIDE FUEL CELL

TECHNICAL FIELD

This application claims priority to and the benefit of Korean Patent Application No. 10-2018-0097787 filed with the Korean Intellectual Property Office on Aug. 22, 2018, the entire contents of which are incorporated herein by reference.

The present invention relates to an apparatus and a method for firing a unit cell for a solid oxide fuel cell, and more particularly, to an apparatus and a method of firing a unit cell for a solid oxide fuel cell, which are capable of performing pre-sintering and main sintering using a single apparatus by adjusting a height of a setter.

BACKGROUND ART

A fuel cell is a device that directly converts chemical energy of fuel and air into electricity and heat through an electrochemical reaction. The fuel cell exhibits high efficiency and does not cause environmental issues because the fuel cell does not perform a combustion process and has no drive device unlike the electric generation technology in the related art that performs processes of combusting fuel, producing vapor, operating a turbine, and operating an electric generator. The fuel cell releases almost no air pollutant such as SOx and NOx and produces a small amount of carbon dioxide. Therefore, the fuel cell implements pollution-free power generation and has advantages such as low noise and no vibration.

The fuel cell is classified into a phosphoric acid fuel cell (PAFC), an alkaline fuel cell (AFC), a polymer electrolyte membrane fuel cell (PEMFC), a direct methanol fuel cell (DMFC), a solid oxide fuel cell (SOFC), and the like. Among these fuel cells, the solid oxide fuel cell has high power generation efficiency due to low overvoltage and low irreversible losses based on low activation polarization. In addition, the solid oxide fuel cell may use carbon or a hydrocarbon-based material as well as hydrogen as fuel, thereby providing a wider choice of fuel. The solid oxide fuel cell has a high reaction rate at the electrodes, such that an expensive precious metal is not required as an electrode catalyst. In addition, the heat released by the power generation is very valuable because the heat has a very high temperature. The heat generated from the solid oxide fuel cell is used not only for reforming the fuel, but also for industrial or cooling energy sources in cogeneration.

The basic operational principle of the solid oxide fuel cell (SOFC) will be described. The solid oxide fuel cell is basically a device that generates power through oxidation of hydrogen, and electrode reactions shown in Reaction Formula 1 are performed at an anode, which is a fuel electrode, and a cathode which is an air electrode.

Air Electrode: $½O_2 + 2e^- \rightarrow O^{2-}$

Fuel Electrode: $H_2 + O^{2-} \rightarrow H_2O + 2e^-$

Entire Reaction: $H_2 + ½O_2 \rightarrow H_2O$     [Reaction Formula 1]

That is, electrons reach the air electrode via an external circuit, and at the same time, oxygen ions generated at the air electrode are transferred to the fuel electrode through an electrolyte, such that hydrogen is coupled to oxygen ions at the fuel electrode to produce electrons and water. In the solid oxide fuel cell, a dense electrolyte layer is provided, and a porous air electrode layer and a fuel electrode layer, as electrodes, are formed with the electrolyte layer interposed therebetween. The electrode reaction occurs at the interface between the electrolyte layer and the electrode layer.

In order to manufacture a unit cell of the solid oxide fuel cell, a product is manufactured by firing a stack made by joining two or more layers made of different materials. The layers have different contraction percentages and different coefficients of thermal expansion, which causes the stack to be warped when the stack is fired. If the stack is warped, the stack may not be manufactured as the product. If the stack is warped, a large amount of stress is applied to the unit cell, and as a result, there is a problem that the defect rate of the product increases and a separate flattening process is required after firing.

In this regard, in order to produce a high-quality product, there is a need for an apparatus and a method for firing a unit cell for a solid oxide fuel cell, which are capable of obtaining a flat cell by solving the problem of warping that occurs during the firing.

DETAILED DESCRIPTION OF THE INVENTION

Technical Problem

The present invention has been made in an effort to provide an apparatus and a method for firing a unit cell for a solid oxide fuel cell, which are capable of performing, simultaneously, instead of in two steps, processes of firing and flattening a stack made by joining two or more layers made of different materials at the time of manufacturing a unit cell for a solid oxide fuel cell by adjusting heights of multiple setters depending on a process condition.

Technical Solution

An apparatus for firing a unit cell for a solid oxide fuel cell according to an exemplary embodiment of the present invention includes a plurality of setters configured to support stacks, each setter having opposed surfaces and a pair of supports coupled to the plurality of setters and configured to support the plurality of setters, in which the opposed surfaces of at least one of the plurality of setters are made of different materials, and a height of the plurality of setters is adjustable along the pair of supports.

In one exemplary embodiment, the opposed surfaces of a lowermost setter of the plurality of setters positioned may be made of a same material.

In one exemplary embodiment, a first surface of the at least one of the plurality of setters may be made of a material non-reactive to an electrolyte, and a second surface of the at least one of the plurality of setters may be made of a material non-reactive to an anode.

In one exemplary embodiment, each of the stacks may include an anode and an electrolyte.

In one exemplary embodiment, a first surface of the at least one of the plurality of setters may include a dense ceramic material, and a second surface of the at least one of the plurality of setters may include a porous ceramic material.

In one exemplary embodiment, the dense ceramic material may include an alumina ceramic material, and the porous ceramic material may include one or more of porous alumina ceramic and silicon carbide (SiC) ceramic.

A method of firing a unit cell for a solid oxide fuel cell according to an exemplary embodiment of the present invention includes: disposing stacks on the plurality of setters coupled to the pair of supports of the apparatus for firing a unit cell for a solid oxide fuel cell; adjusting heights of the plurality of setters so that the plurality of setters are spaced apart from the stacks, and then primarily firing the stacks; and adjusting the heights of the plurality of setters to a height equal to or smaller than a height of the stacks, and then secondarily firing the stacks.

In one exemplary embodiment, in the primarily firing of the stacks, the stack may be warped toward an upper surface thereof.

In one exemplary embodiment, in the secondarily firing of the stacks, the plurality of setters may press the stacks such that the stack is flat.

In one exemplary embodiment, in the secondarily firing of the stacks, the plurality of setters may not be fixed to the pair of supports.

Advantageous Effects

According to the present invention, there is an effect that it is possible to perform, simultaneously, instead of in two steps, the processes of firing and flattening a stack made by joining two or more layers made of different materials at the time of manufacturing a unit cell for a solid oxide fuel cell by adjusting heights of the multiple setters depending on conditions of two heat treatment processes.

In addition, since the firing and flattening processes are performed simultaneously, there is an effect that it is possible to reduce the number of heat treatment processes, reduce the process time and costs, make it easy to adjust a size and a thickness of the cell, form uniform cells, reduce a defect rate of a product, improve productivity, and facilitate mass-production.

BRIEF DESCRIPTION OF DRAWINGS

FIG. 1 is a cross-sectional view illustrating an apparatus for firing a unit cell for a solid oxide fuel cell according to an exemplary embodiment of the present invention.

FIG. 2A is a cross-sectional view illustrating the apparatus for firing a unit cell for a solid oxide fuel cell according to the exemplary embodiment of the present invention during a primary firing step (pre-sintering), and FIG. 2B is a cross-sectional view illustrating the apparatus for firing a unit cell for a solid oxide fuel cell according to the exemplary embodiment of the present invention during a secondary firing step (main sintering).

BEST MODE

Hereinafter, the present invention will be described in detail with reference to the accompanying drawings. Here, repeated descriptions and detailed descriptions of publicly known functions and configurations, which may unnecessarily obscure the subject matter of the present invention, will be omitted. Exemplary embodiments of the present invention are provided to completely explain the present invention to a person with ordinary skill in the art. Therefore, shapes and sizes of elements illustrated in the drawings may be exaggerated for a more apparent description.

Throughout the specification, unless explicitly described to the contrary, the word "comprise" or "include" and variations, such as "comprises", "comprising", "includes" or "including", will be understood to imply the inclusion of stated constituent elements, not the exclusion of any other constituent elements.

Hereinafter, exemplary embodiments are proposed to help understand the present invention. However, the following exemplary embodiments are provided just for more easily understanding the present invention, and the contents of the present invention are not limited by the exemplary embodiments.

<Apparatus for Firing Unit Cell for Solid Oxide Fuel Cell>

FIG. 1 is a cross-sectional view illustrating an apparatus for firing a unit cell for a solid oxide fuel cell according to an exemplary embodiment of the present invention.

The apparatus for firing a unit cell for a solid oxide fuel cell according to the present invention may include a setter 10 and a support 20.

The setter 10 is configured to support a stack, and multiple setters may be provided. The stack is made by stacking an anode and an electrolyte of a solid oxide fuel cell. The setter 10 is a ceramic plate used to fire the stack. The use of the setter 10 may prevent deformation of an object to be fired and may maintain electrical characteristics by uniformly transferring heat. Further, both surfaces of the setter 10 according to the present invention may be made of different materials.

In one exemplary embodiment, one surface 10a of the setter 10 may be made of a material non-reactive to the electrolyte, and the other surface 10b of the setter 10 may be made of a material non-reactive to the anode. In this case, one surface 10a of the setter may be in contact with the electrolyte of the stack to support the stack, and the other surface 10b of the setter may mean the opposite surface that may be in contact with the anode of the stack to support the stack.

Here, the setter 10 may include a ceramic material. One surface 10a may include a dense ceramic material, and the other surface 10b may include a porous ceramic material. In more detail, one surface 10a may include a dense alumina ceramic material, and the other surface 10b may include any one ceramic material of a porous alumina and a silicon carbide (SiC).

The binder-burnt out occurs in which organic substances present in the stack are burnt out during a primary firing (pre-sintering) process, such that the stack is warped while the organic substances are burnt out.

Since the other surface 10b of the setter includes a porous ceramic material, gases, which are generated during the binder burnt-out process and the process of firing the stack, are smoothly discharged, and no crack may be formed in the stack. In addition, the stack does not adhere or is not attached to the surface 10b of the porous ceramic setter before the binder is burnt out, and as a result, it is possible to obtain an effect of obtaining a uniformly fired body.

Further, since one surface 10a of the setter includes a dense ceramic material, it is possible to prevent a reaction between the setter 10 and the electrolyte of the stack and prevent one surface 10a of the setter from being damaged by the electrolyte during the secondary firing process.

The number of setters 10 according to the present invention may be more than one. The setter 10, which is positioned at the lowermost end of the apparatus for firing a unit cell for a solid oxide fuel cell, may have one surface and the other surface made of the same material. The setter 10c positioned at the lowermost end may support the stack and thus include a porous ceramic material non-reactive to the anode.

The support 20 may be coupled to the multiple setters 10 to support the setters 10. A pair of supports 20 may be provided and positioned at lateral sides corresponding to the setters 10.

The support 20 may be provided in the form of a screw and thus thread-coupled to the setter 10. In this case, the setter 10 may further include coupling portions (not illustrated) at the corresponding lateral sides so as to be coupled to the support 20.

In addition, the position of the setter 10 may be adjusted along the support 20, such that a height between the setters 10 may be adjusted depending on the firing process.

When the stack is warped by the binder burnt-out during the primary firing process, the position of the setter 10 may be adjusted to make the height between the setters 10 larger than the flatness of the stack in order to prevent the setter 10 from pressing the stack. In this case, regarding the flatness, it is determined that the cell is flat when a numerical value made by dividing a highest point of the warped stack, when the warped stack is placed on a flat floor after the firing is performed, by a thickness of the cell is close to 1.

In order to flatten the warped stack during the flattening process as the secondary firing process, it is necessary to apply pressure to the stack by applying weight to the stack. Therefore, the position of the setter 10 may be adjusted so that the setter 10 comes into contact with the stack and applies pressure to the stack.

Further, any one of the setter 10 and the support 20 may further include a fixing unit (not illustrated) configured to fix the position of the setter 10.

<Method of Firing Unit Cell for Solid Oxide Fuel Cell>

FIG. 2A is a cross-sectional view illustrating the apparatus for firing a unit cell for a solid oxide fuel cell according to the exemplary embodiment of the present invention during a primary firing step (pre-sintering), and FIG. 2B is a cross-sectional view illustrating the apparatus for firing a unit cell for a solid oxide fuel cell according to the exemplary embodiment of the present invention during a secondary firing step (main sintering).

The method of firing a unit cell for a solid oxide fuel cell according to the present invention may include a primary firing step S100 and a secondary firing step S200. Here, the secondary firing step S200 is the flattening step.

The primary firing step S100 may include a step S110 of disposing the stacks on the multiple setters 10 coupled to the pair of supports 20, and a step S120 of adjusting the heights of the setters 10 so that the setters 10 are spaced apart from the stacks, and then firing the stacks.

The primary firing step S100 is performed during or after the binder burnt-out process in which the organic substances present in the stacks are burnt out. In this case, the primary firing step may be performed within a range from 200° C. to 600° C.

Further, in the primary firing step, the stack is warped due to differences in coefficients of thermal expansion between the components that constitute the stack, and the stack is warped toward an upper surface of the stack. In this case, the upper surface of the stack means a surface that is not in contact with the setter 10, that is, a surface that is in contact with the setter 10 during the secondary firing to be described below.

Cracks may be formed in the stack if a physical pressure is applied to the stack when the stack is warped. Therefore, the height between the setters 10 in the primary firing step needs to be larger than the flatness of the stack.

The secondary firing step is a step of flattening the stack warped by the primary firing, that is, a step of adjusting the height between the setters 10 to a height equal to or smaller than the height of the stack and then increasing a temperature to fire the stack.

Here, the height of the stack may mean a difference between a highest point and a lowest point of the curved stack deformed during the primary firing. By adjusting the height between the setters 10 to the height equal to or smaller than the height of the stack, a yield point of the stack is decreased by heat, and the setter 10 applies a predetermined pressure, which is equal to or higher than the yield point, to the stack, thereby flattening the stack.

In this case, the secondary firing step may secondarily fire the stack in a temperature section within a range from 500° C. to 1500° C. When the firing temperature is equal to or higher than 500° C., the stack may be flattened by a small weight. When the firing temperature is equal to or lower than 1,500° C., the process of flattening the stack needs to be performed with a large weight, but it is possible to obtain a denser electrolyte.

The setter 10 may not be fixed to the support 20 so that the pressure is applied to the stack through the setter 10. That is, since the setter 10 is not fixed to the support 20, the setter 10 may apply the pressure to the stack by gravity and may apply the pressure without being spaced apart from the stack even during the process of flattening the stack.

In a case in which the setter 10 includes one material, that is, in one exemplary embodiment in which the setter 10 includes a porous ceramic material, there occurs a problem in that in the secondary firing step, the anode of the stack and the other surface 10b of the setter come into contact with each other and the setter 10 and the stack react with each other. Further, since the primary and secondary firing steps are performed by the single firing apparatus, there may occur a problem in that production quality deteriorates due to differences in temperature and pressure between the two firing processes.

Therefore, between the both surfaces of the setter 10, the other surface 10b of the setter 10, which is in contact with the anode of the stack, may include a porous ceramic material that does not react with the anode, and one surface 10a may include a dense ceramic material that does not react with the electrolyte.

Further, the method of firing a unit cell for a solid oxide fuel cell according to the present invention may further include a step of manufacturing a unit cell for a solid oxide fuel cell by forming a cathode on the surface of the electrolyte by printing after firing the stack.

While the present invention has been described above with reference to the exemplary embodiments, it may be understood by those skilled in the art that the present invention may be variously modified and changed without departing from the spirit and scope of the present invention disclosed in the claims.

The invention claimed is:

1. An apparatus for firing a unit cell for a solid oxide fuel cell, the apparatus comprising:
a plurality of setters configured to support stacks, each setter having opposed surfaces; and
a pair of supports coupled to the plurality of setters and configured to support the plurality of setters,
wherein the opposed surfaces of at least one of the plurality of setters are made of different materials, and
wherein a height of the plurality of setters is adjustable along the pair of supports.

2. The apparatus of claim 1, wherein the opposed surfaces of a lowermost setter of the plurality of setters are made of a same material.

3. The apparatus of claim 1, wherein a first surface of the at least one of the plurality of setters is made of a material non-reactive to an electrolyte, and a second surface of the at least one of the plurality of setters is made of a material non-reactive to an anode.

4. The apparatus of claim 1, wherein each of the stacks includes an anode and an electrolyte.

5. The apparatus of claim 1, wherein a first surface of the at least one of the plurality of setters includes a dense ceramic material, and a second surface of the at least one of the plurality of setters includes a porous ceramic material.

6. The apparatus of claim 5, wherein the dense ceramic material includes an alumina ceramic material, and the porous ceramic material includes one or more of porous alumina ceramic and silicon carbide (SiC) ceramic.

7. A method of firing a unit cell for a solid oxide fuel cell, the method comprising:

disposing stacks on the plurality of setters coupled to the pair of supports of the apparatus for firing a unit cell for a solid oxide fuel cell according to claim 1;

adjusting heights of the plurality of setters so that the plurality of setters are spaced apart from the stacks, and then primarily firing the stacks; and adjusting the heights of the plurality of setters to a height equal to or smaller than a height of the stacks, and then secondarily firing the stacks.

8. The method of claim 7, wherein in the primarily firing of the stacks, the stack is warped toward an upper surface thereof.

9. The method of claim 7, wherein in the secondarily firing of the stacks, the plurality of setters press the stacks such that the stack is flat.

10. The method of claim 7, wherein in the secondarily firing of the stacks, the plurality of setters are not fixed to the pair of supports.

* * * * *